United States Patent [19]
Dirks

[11] Patent Number: 6,119,214
[45] Date of Patent: Sep. 12, 2000

[54] METHOD FOR ALLOCATION OF ADDRESS SPACE IN A VIRTUAL MEMORY SYSTEM

[75] Inventor: Patrick W. Penzias Dirks, San Jose, Calif.

[73] Assignee: Apple Computer, Inc., Cupertino, Calif.

[21] Appl. No.: 08/231,657

[22] Filed: Apr. 25, 1994

[51] Int. Cl.[7] ............................. G06F 12/10; G06F 12/12
[52] U.S. Cl. ........................... 711/206; 711/159; 711/209
[58] Field of Search ............................... 395/486, 497.03, 395/412, 419, 497.01, 497.02, 600

[56] References Cited

U.S. PATENT DOCUMENTS

| | | | |
|---|---|---|---|
| 4,577,274 | 3/1986 | Ho et al. ................................... | 395/415 |
| 4,967,353 | 10/1990 | Brenner et al. .......................... | 395/487 |
| 5,101,485 | 3/1992 | Perazzoli, Jr. ........................... | 395/416 |
| 5,109,336 | 4/1992 | Guenther et al. ................... | 395/497.02 |
| 5,125,086 | 6/1992 | Perazzoli, Jr. ........................... | 395/486 |
| 5,175,834 | 12/1992 | Sawai ..................................... | 395/478 |
| 5,237,673 | 8/1993 | Orbits et al. ........................ | 395/497.01 |
| 5,269,109 | 12/1993 | Abramson et al. ...................... | 395/650 |
| 5,392,415 | 2/1995 | Badovinatz et al. ..................... | 395/406 |

OTHER PUBLICATIONS

Beretvas, T., et al, "Blocked Page–Out", *IBM Technical Disclosure Bulletin*, vol. 26, No. 9, Feb. 1984, pp. 4753–4754.

*Power PC 601 RISC Microprocessor User's Manual*, Motorola, Inc., 1993, pp. 6–1 to 6–64.

*Primary Examiner*—Jack A. Lane
*Attorney, Agent, or Firm*—Burns, Doane, Swecker & Mathis, L.L.P.

[57] ABSTRACT

A memory manager for a virtual memory system maintains three lists of virtual addresses: those which are free to be mapped to a program, those which are currently mapped but no longer being used, and those which are being removed from a page table, i.e. unmapped. The allocation of free addresses to programs proceeds in parallel with the removal of old entries from the page table, such that new free addresses are guaranteed to be available at all times. Each time that a new address is allocated to a program, a limited number of entries in the page table are examined, to determine whether the addresses associated with those entries are no longer in use, and the entries can be removed from the page table. By the time that all of the available addresses in the free list have been allocated, the entire page table will have been examined and all addresses which are no longer in use will have had their corresponding page table entries removed, so that they are available as free addresses. As a result, a constant supply of free addresses are provided with only a limited amount of processing time at regular intervals during the operation of a computer.

23 Claims, 7 Drawing Sheets

| VSID 1 | 00 |
| --- | --- |
| VSID 2 | 00 |
| VSID 3 | 01 |
| VSID 4 | 10 |
| VSID 5 | 10 |
| VSID 6 | 01 |
| ⋮ | ⋮ |
| VSID n-1 | 00 |
| VSID n | 00 |

FIG. 9 ued States Patent 6,119,214

METHOD FOR ALLOCATION OF ADDRESS SPACE IN A VIRTUAL MEMORY SYSTEM

FIELD OF THE INVENTION

The present invention is directed to the management of memory in a computer system, and more particularly to the allocation of address space in a virtual memory system for a computer.

BACKGROUND OF THE INVENTION

In the operation of a computer, software programs that are running on the computer require access to the computer's main memory, e.g., RAM, in order to carry out their operations. To this end, therefore, each program is allocated a range of memory addresses, which are available for use by that program. This range of allocated addresses is sometimes referred to as the program's address space. In actual practice, a program may only use a fraction of its allocated addresses at any given time. Consequently, if the allocated address space corresponds to actual physical space within the main memory, a large portion of the memory will not be used.

While this situation may be acceptable if only one program is running on the computer, it can present significant limitations if multiple programs are to be run, for example in a multi-tasking environment. More particularly, once address space is allocated to a particular program, it cannot be accessed by other programs, even if it is not being currently used, because it must always be available for use by the program to which it has been allocated. As a result, once all available memory has been allocated, additional programs cannot be run until some memory space is freed up, for example by closing a program.

To alleviate this situation, virtual memory technology has been developed. In this technology, the addresses that are assigned for use by individual programs are distinct from the actual physical addresses of the main memory. The addresses which are allocated to the programs are often referred to as "logical" or "virtual" or "effective" addresses, to distinguish them from the "physical" addresses of the main memory. Whenever a program requires access to memory, it makes a call to a logical address within its assigned address space. A memory manager associates this logical address with a physical address in the main memory, where the information called for by the program is actually stored. The identification of each physical address that corresponds to a logical address is commonly stored in a data structure known as a page table. This term is derived from the practice of dividing the memory into individually addressable blocks known as "pages".

Through the use of virtual memory, the available physical memory can be utilized more effectively. More particularly, physical addresses only need to be assigned to those logical addresses which are currently active. If a program is not using a portion of its assigned address space, no physical addresses need be associated with these unused logical addresses. By marking pages of data as temporarily inaccessible, the associated physical page can be copied to secondary storage and reassigned to map some other virtual page. As a result, a larger portion of the main memory is available for use by other programs. Each program can continue to operate as if it has a large contiguous address space available to it, however.

In many instances, two or more logical addresses may be mapped to the same locations in the physical memory. For example, two or more applications might share a common data file. Each application uses a different logical address to access the file. In this situation, the page table contains multiple references to the same physical address.

Since available physical addresses are mapped to logical addresses as needed, adjacent logical addresses are typically mapped to widely separated portions of physical memory, and vice versa. Furthermore, during operation the physical addresses are constantly being remapped as different operations are carried out. As a result, there is not necessarily a direct relationship between logical and physical addresses.

When an action occurs which removes the need for further memory accesses, e.g. an application program or a file is closed, it is no longer necessary to assign address space to that entity. Upon the occurrence of such an action, therefore, a command is sent to the memory manager to delete an area, or range of addresses, assigned to the file. At this point, however, the physical memory still has an entry or address mapped in the page table, which is therefore not free for other uses.

In order to free the addresses for further use, their corresponding entries must be removed from the page table. In some types of page tables, contiguous logical addresses are mapped to contiguous page table entries. In these types of page tables, when an address area is deleted, all of the page table entries associated with that area can be readily identified and removed from the table.

In other types of architectures, however, there is not such a direct relationship between logical addresses and page table entries. For example, in some architectures the physical address of the page table entry is determined by means of a hashing function. In this approach, the page table entry might be determined through a logical combination of different components of an address, for example in accordance with a prescribed function, rather than a straight index using one or more components of the address. As a result, page table entries which map adjacent logical addresses could be widely separated in the table. There is no fixed relationship between the locations of page table entries for adjacent logical addresses.

Consequently, when a file is closed, or portions of memory are otherwise rendered inactive, there is no simple, effective way to locate all page table entries that might be associated with the inactive addresses. Since the page table entries for a file could be scattered throughout the table, it may be necessary to check every entry in the page table, i.e. to scan the table. Alternatively, it is possible to compute all possible page table entries for the given range of inactive addresses, using the hashing function, and check each such entry. During the time that the scanning of the page table is being carried out to identify inactive entries, software programs might need to be temporarily halted. For computers having relatively large amounts of address space, and a large number of entries in their page tables, the time required to scan all of the entries in the page table can be considerable. If a complete scan of the page table is carried out at once, delays in the running of the programs can result. In addition, a complete scan of the page table may be too expensive an operation, in terms of operating efficiency, to carry out every time a range of addresses is inactivated.

Accordingly, it is desirable to provide a method for efficiently allocating and deallocating large amounts of address space in a virtual memory system that does not require excessive processing time and therefore does not result in unacceptable delays in the operation of a computer.

BRIEF STATEMENT OF THE INVENTION

In accordance with the present invention, virtual memory space is managed in a manner which allows new address ranges to be allocated and deallocated in a constant, small amount of time, such that the need for a single complete sweep of all memory allocation records in a page table, to remove unused entries and prepare the addresses for further use, can be avoided.

The memory manager of the present invention maintains three lists of virtual address ranges, namely those which are free to be allocated, i.e. mapped, to a program, those which are currently assigned but no longer being used, and those which are being removed from the page table. The removal of old entries from the page table proceeds in parallel with the allocation of free addresses to programs, such that new free addresses are guaranteed to be available at all times. More specifically, each time that a new range of addresses is allocated to a program, a limited number of entries in the page table are examined, to determine whether the addresses associated with those entries are no longer in use and the entries can be removed from the page table. By the time that all of the addresses in the free list have been allocated, the entire page table has been examined and all entries associated with unused addresses have been removed. The addresses whose entries have been removed can then be transferred to the list of free addresses, so that allocation can continue uninterrupted.

Thus, rather than halting the operation of the computer for a considerable period of time to scan the entire page table when a logical address area is deleted, the memory manager of the present invention carries out a limited, time-bounded examination upon each address allocation. A constant supply of free address ranges is provided in exchange for a fixed amount of computation time at regular intervals.

The foregoing features and advantages of the invention, as well as others, are described in greater detail hereinafter with reference to specific embodiments illustrated in the accompanying drawings.

BRIEF DESCRIPTION OF THE DRAWINGS

FIG. 9 is a bitmap of the states of the virtual segment identifiers.

DETAILED DESCRIPTION

Figure 1:
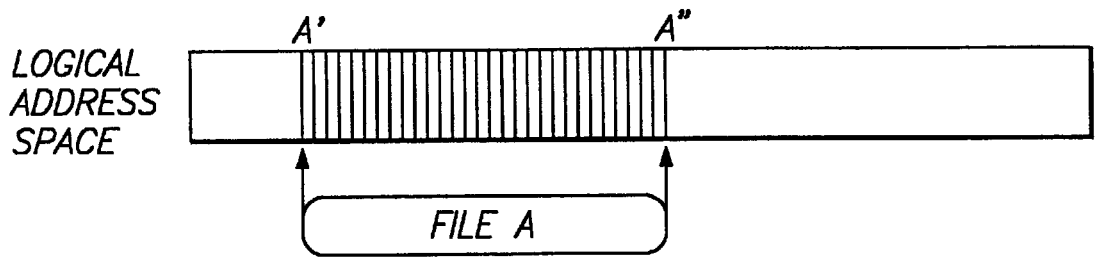
FIG. 1 is an illustration of file mapping by means of a page table in accordance with one embodiment of the present invention.
Figure 2:
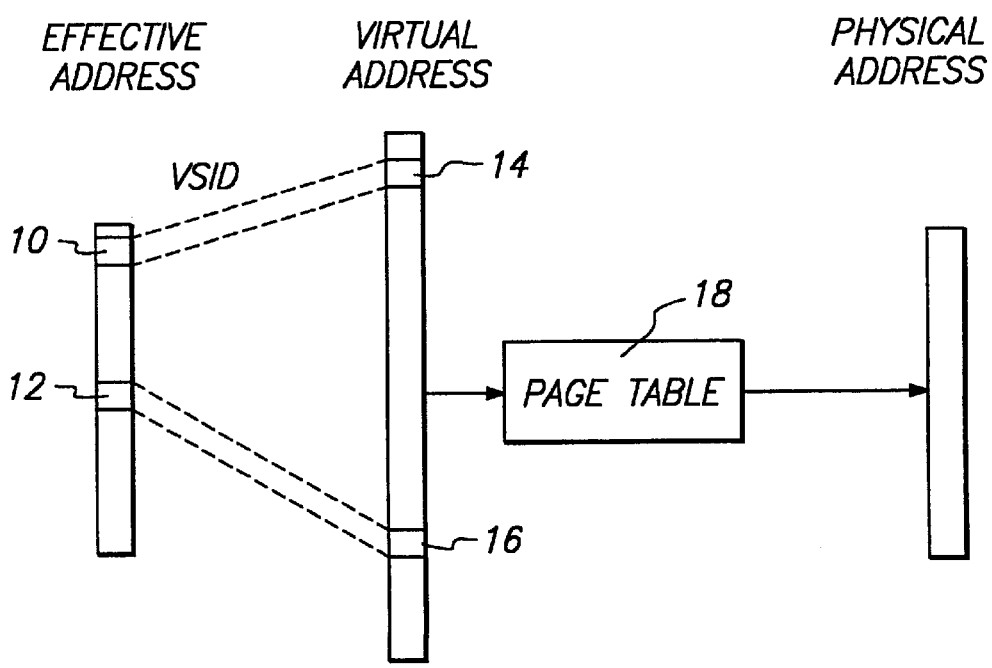
FIG. 2 is a diagram showing the location of a file in a logical address space.
Figure 3:
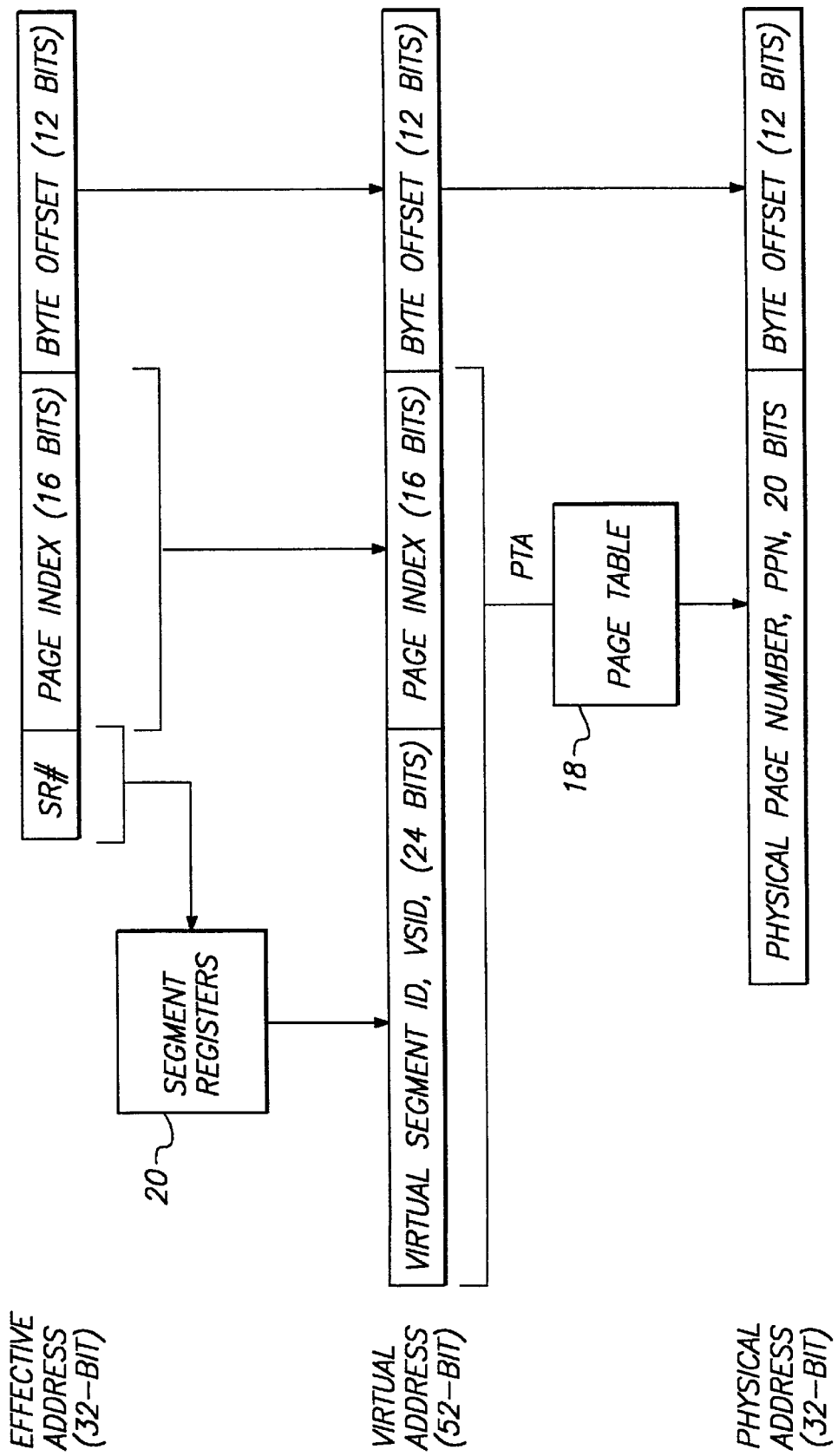
FIG. 3 is a more detailed diagram showing the generation of a physical address from an effective address.

To facilitate an understanding of the invention and its applications, a brief overview of computer memory management is first provided with reference to FIGS. 1–3. The particular example illustrated in these figures pertains to the MPC601 RISC microprocessor sold by Motorola Inc. It will be appreciated however, that the principles of the invention are not limited to this particular embodiment, and that its description is for exemplary purposes only.

Generally speaking, information that is accessed by a computer's Central Processing Unit (CPU) is specified by a location, often referred to as a logical address. A program is assigned a domain of logical addresses, known as a logical address space, as part of the process of preparing the program to run. In a virtual memory computer, a portion of the computer's hardware is responsible for converting given logical addresses into concrete physical addresses, through the use of a page table. This conversion process is referred to as memory mapping. The primary purpose of using this approach is to achieve the virtual memory effect that logical addressing is independent of physical memory addressing.

Referring to FIG. 1, a schematic representation of memory mapping is illustrated. The memory mapping architecture illustrated in FIG. 1 employs three address spaces. An effective address is generated by the currently active program. In a 32-bit system, for example, there are $2^{32}$ possible effective addresses. The second address space consists of virtual addresses. The effective address and the virtual address together are analogous to a logical address in a conventional two-address system. The virtual addresses are never presented outside of the CPU. Rather, the virtual address space is an intermediate step in the generation of the final addresses, namely the real or physical addresses for the memory. Only the physical addresses are presented to a memory controller interface, or the like, to read or write locations in physical memory.

The memory mapping architecture illustrated in FIG. 1 implements a paged, virtual address mapping. The effective address range is divided into a number of segments 10, 12, each of which can be individually mapped to any range 14, 16 of contiguous virtual addresses. Although not illustrated in FIG. 1, two different segments of the effective address range can be mapped to the same range of virtual addresses, and two distinct virtual addresses can be mapped to the same physical address. The virtual addresses are mapped to the physical addresses, using a page table 18. For an exemplary 32-bit system, the effective address range might be divided into 16 segments, each of which is mapped to a 256 MB range of contiguous virtual addresses. The particular segment of the effective address range is designated by the first four bits of the address. The size of the virtual address range is defined by the remaining number of bits in the effective address (in this case, 28 bits). The number of segments and size of this range can be varied to meet different memory management hardware requirements.

Referring to FIG. 2, during operation of the computer, the system may use a secondary storage file A to hold copies of physical pages used to map address ranges A' to A". In other words, the file A is mapped into that effective address space. Although not illustrated in FIG. 2, the addresses in the effective address space can be discontiguous, and can be shared among plural programs. The memory manager functions to convert the effective addresses in this range to physical addresses in the main memory.

The translation from effective address to virtual address, and from virtual address to physical address, is illustrated in greater detail in FIG. 3. To facilitate an understanding of the translation mechanism, it will be described with specific reference to its implementation in an exemplary 32-bit system, in which the memory is divided into pages each having a size of 4K bytes. In the first step of the translation, the four most significant bits of the effective address (labelled SR#) are used to select one of sixteen segment registers 20. Each segment register holds a 24-bit virtual segment identifier (VSID) which identifies a unique 256 MByte range in the virtual address space.

The lower order 28 bits of the effective address are divided into a 16-bit page index and a 12-bit byte offset. A given page in the virtual address space is mapped onto a page in the physical address space through the page table 18. The specific entry in the page table is identified by the VSID and the 16-bit page index. The 12-bit byte offset defines an individual one of the 4K bytes within the page of memory.

In order to efficiently map a sparsely populated effective address space or virtual address space, the identification of the entries in the page table can be implemented with a hashing function. Any suitable hashing function can be employed to determine the address for a page table entry. For example, a variable number of the lower-order bits of the VSID can be logically combined with the page index bits in the virtual address, by means of an EXCLUSIVE-OR function. The resulting value can then be combined with any suitable base offset, to produce a 32-bit address page table address (PTA) which identifies an entry in the page table 18. The value stored at this entry comprises a 20-bit physical page number (PPN). The physical page number is then combined with the byte offset (the 12 lowest order bits of the effective address) to produce a 32-bit physical address.

Through the use of the hashing function, the page table entries are efficiently distributed within the page table. The page table size itself is variable. It can be adjusted to allow room for more page table entries on systems with more physical memory or where more sharing of physical memory pages is anticipated.

In practice, an operating system typically needs to deal with two types of addressing contexts, namely large areas mapping the code related to an active application or task, and small areas that hold information specific to a thread of control running in the application's context to execute a specific task. Some of these areas might be shared, i.e. two or more effective addresses can point to the same location in physical memory. While large application contexts are generally allocated and removed infrequently, in practice threads can be created and deleted at high rates. Thread creation and deletion are important operations that must be carried out efficiently if an operating system is to perform well. In the following discussion, therefore, specific reference will be made to operations that occur upon the creation and deletion of threads. It will be appreciated that these operations apply to the addressing of applications as well.

In operation, the memory manager assigns a range of virtual address space to threads as they are created, mapping segments in the effective address space to virtual segments in the virtual address space. This results in an active virtual address space that is larger than the effective address space of any given thread. The amount of virtual address space that is in use at any given time is a concatenation of all threads' and applications' address spaces. This space can be much greater than the size of the physical memory, depending on the amount of sharing of physical memory. However, only the pages which are actually mapped consume space in the page table.

As the thread is running and generates requests for pages of memory, virtual pages within the 256 MB range are mapped to the page table. When a thread is switched, the operating system switches from one segment register to another to change the mapping of effective addresses to virtual addresses, as well as the resulting physical addresses.

When a thread is deleted, all page table entries that refer to virtual addresses which are valid for that thread must be removed from the page table before the range of virtual addresses can be assigned to another thread. Otherwise, the reused addresses might refer to old memory mappings that are no longer valid. Since the page table is hashed, entries belonging to a given thread are likely to be scattered throughout the page table. The VSID, by itself, does not provide sufficient information to locate all page table entries that might belong to a given virtual segment, without checking every entry in the page table. Scanning the complete page table every time a thread is created or deleted would be too inefficient and time consuming. Accordingly, the present invention is directed to an efficient approach which provides constant removal of unused entries of the page table, in parallel with the creation and deletion of threads and applications.

Figure 4:
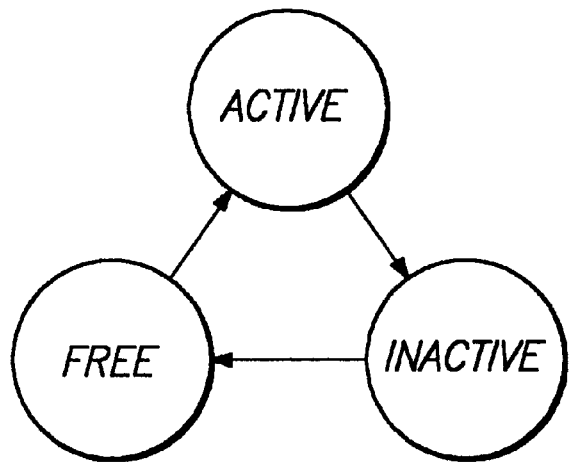
FIG. 4 is a state diagram of the possible states for virtual addresses.

In the implementation of the present invention, the virtual addresses are designated as being in one of several states. More particularly, in the control of the memory system, all of the addresses (VSIDS) for the virtual address space can reside in one of three states. Referring to FIG. 4, all of the VSIDs are initially in a free state in which they have not been reserved for use by a thread or application. When a VSID is subsequently allocated to an application or thread, it is labeled as active. At some point in time, the VSID becomes inactive. This can occur, for example, when a thread terminates. In the inactive state, pages within the virtual address range of the VSID are still mapped to the page table. However, the data contained in the associated pages of physical memory is no longer being accessed by the CPU. In this state, the entries can be removed from the page table, and the VSID subsequently returned to the free state. Until such time as the entries are removed from the page table, however, they remain mapped and are therefore not available to be allocated to other applications or threads.

Figure 5:
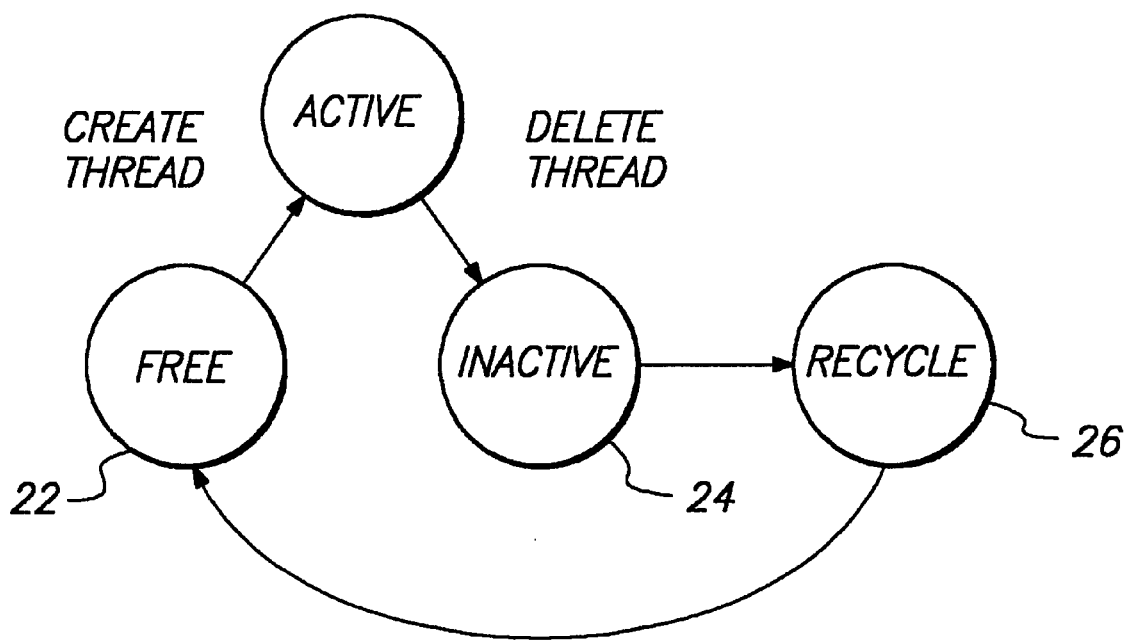
FIG. 5 is a state diagram of address states as monitored in accordance with the present invention.

Generally speaking, the return of VSIDs from the inactive state to the free state is carried out by sweeping the entries in the page table, i.e. examining each entry to determine whether it is associated with an inactive VSID, and removing every entry which has been so identified. In accordance with the present invention, the sweeping of the page table is not carried out in one colossal step, for example after all of the free VSIDs have been allocated. Rather, the sweeping is carried out in an incremental, ongoing manner to avoid significant interruptions in the running of programs. Referring to FIG. 5, the memory manager of the present invention maintains three lists of VSIDs. One list 22 comprises free VSIDs which have not been allocated to a program or thread. A second list 24 identifies those VSIDs which have been deleted and are therefore inactive. A third list 26, labelled the recycle list, contains those VSIDs whose entries are in the process of being removed from the page table. Although the active state of the VSIDs is also shown in FIG. 5, the VSIDs in this state do not need to be explicitly stored in a list. Typically, they are tracked in other data structures, such as process control tables.

Although described as three different lists, in a practical implementation these items of information need not be stored as three separate entities in the memory manager. For example, all possible VSIDs can be stored in a single bitmap, as shown in FIG. 9. Associated with each entry in the bitmap is an identifier which indicates whether the VSID is free (00), inactive (01) or being recycled (10). Suitable data structures other than a bitmap can be employed as well to identify the states of the respective VSIDs, such as a list which maps each VSID to one of the three states.

In operation, the VSIDs on the inactive list are transferred to the recycle list at a certain time, for example when a predetermined number of VSIDs have been placed on the inactive list. Thereafter, each time a VSID is assigned from the free list to a new application or thread, a fixed number of entries in the page table are scanned to determine whether they have become inactive, by checking them against the VSIDs on the recycle list. Each entry which is identified as being inactive is removed from the page table. After all of the entries in the page table have been examined in this manner, the VSIDs in the recycle list can be transferred to the free list, since all of their associated page table entries will have been removed. This approach thereby guarantees that a predetermined number of VSIDs are always available in the free list without requiring a time-consuming scan of the complete page table at once.

In one embodiment of the invention, the number of page table entries that are examined upon each allocation of a VSID in the free list can be determined from the total number of entries in the page table and the number of threads and applications that are allowed to be active at any given time. For example, if the page table contains 10,000 entries and 500 threads/applications are allowed to be active at any given time, the 10,000 page table entries should be covered in a maximum of 500 steps (assuming each thread and application is assigned one segment each). The number of entries that are swept in each step is therefore 10,000/500=20 entries per step. Thus, for example, as the first VSID in the free list is assigned to a thread or application, entries 0–19 in the page table are examined. Each of those entries which is associated with an inactive VSID on the recycle list is removed from the page table. As the next VSID in the free state is allocated, entries 20–39 in the page table are examined. The process continues in this manner. Thus, after 500 VSIDs have been allocated from the free list, all 10,000 entries in the page table will have been examined. At this point, all of the entries in the page table that are associated with inactive VSIDs on the recycle list will have been removed. The VSIDs can therefore be transferred to the free list, and the process begun anew.

Any other suitable approach can be employed to determine the number of entries to be examined during each step of the sweeping process. In this regard, it is not necessary that the number of examined entries be fixed for each step. Rather, it might vary from one step to the next. The only criterion is that the number of entries examined on each step be such that all entries in the page table are examined in a determinable amount of time or by the occurrence of a certain event, e.g. by the time the list of free VSIDs is empty.

Generally speaking, the sizes of the free, inactive and recycle lists are determined by the range of VSIDs that need to be allocated. If at most x threads/applications can be active at any time, the free list should start with 3x entries. A recycling sweep, i.e. a removal of inactive entries from the page table, can begin as soon as the inactive list contains x entries. At this point, the free list will contain between x and 2x entries, depending upon the number of active threads and applications at that time. In the worst case, the free list will always contain at least x VSIDs.

Once the inactive list contains x entries, the VSIDs on the inactive list are transferred to the recycle list, for example by changing a pointer or other suitable identifier in a bitmap listing of VSIDs. The recycling sweep is carried out as free VSIDs are consumed. Since the free list contains at least x entries at this time, the sweep is guaranteed to be complete before the free list is completely empty. Once the sweep is completed, it will yield x new VSIDs that are transferred to the free list.

Figure 6:
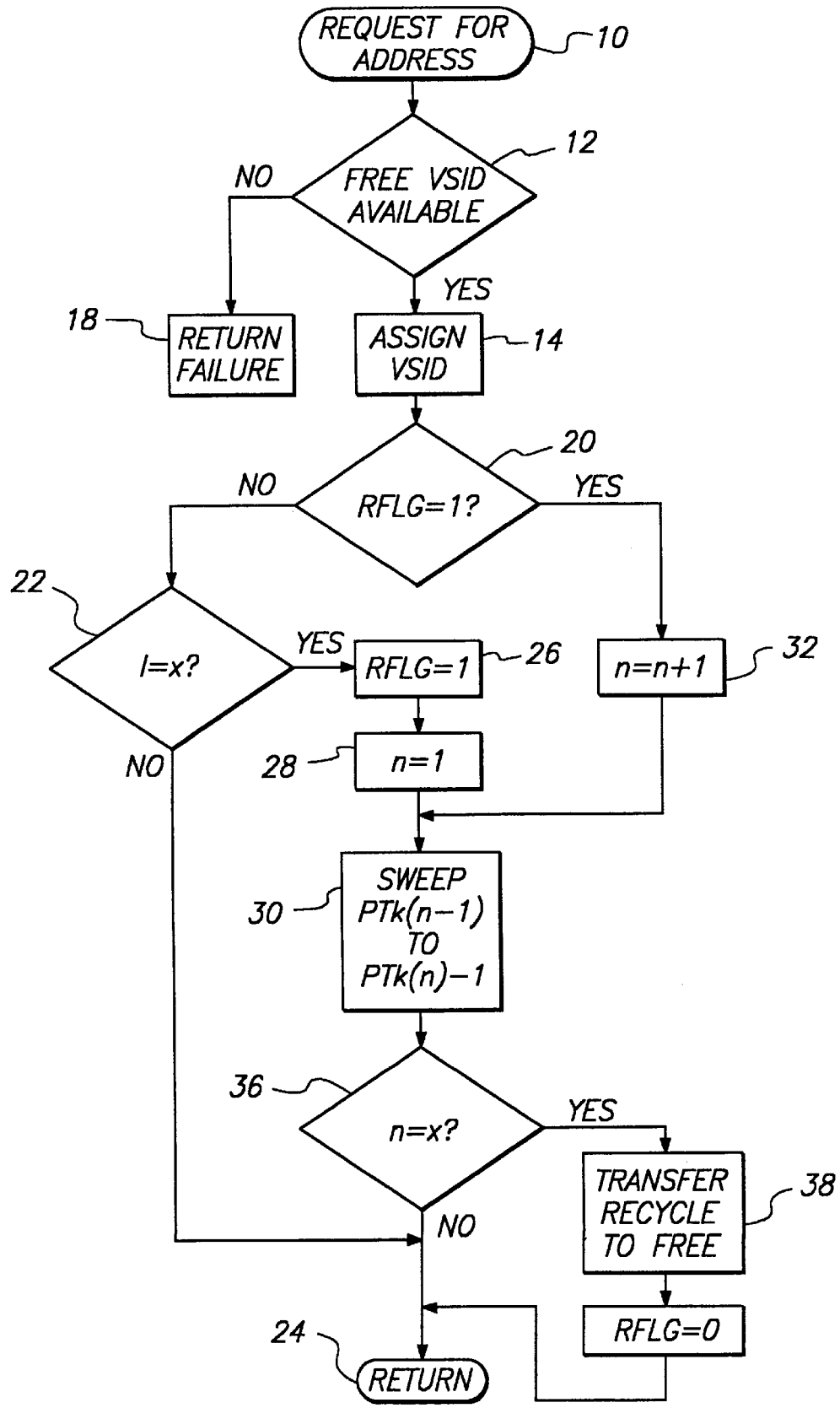
FIG. 6 is a flow chart of the operation of a memory manager in accordance with the present invention.

A flowchart which depicts the operation of the address allocation portion of a memory manager, in accordance with the present invention, is illustrated in FIG. 6. Referring thereto, operation begins when a request for address space is generated (Step 10). This can occur when a thread is created, for example. In response thereto, the operating system checks the free list to determine whether a free VSID is available (Step 12). If so, a free VSID is allocated to the thread that generated the request (Step 14). In the case of an application, two or more VSIDs might be assigned. If no free VSID is available at Step 12, a failure status is returned (Step 18). In practice, however, such a situation should not occur, since the process of the present invention ensures that free VSIDs are always available.

After the new VSID has been allocated, the system checks a flag RFLG to determine whether a recycle sweep is currently in progress (Step 20). If there is no sweep in progress, i.e. RFLG is not equal to one, a determination is made whether a sweep should be initiated. This is done by checking whether the inactive list is full, i.e. whether it contains x entries (Step 22). If the number of entries I on the inactive list is less than x, no further action is taken, and processing control returns to the operating system (Step 24). If, however, the inactive list is full at this time, the flag RFLG is set (Step 26), the VSIDs on the inactive list are transferred to the recycle list, and an index n is reset to 1 (Step 28). The system then sweeps a predetermined number of page table entries $PT_i$ on the page table, to detect whether any of them are inactive, i.e. their associated VSID is on the recycle list (Step 30). The predetermined number of entries that are swept is identified as k, where $$k = \frac{\text{total number of page table entries}}{\text{maximum number of active threads}}$$

In the example given previously, k=10000/500=20. For a given value of the index n, therefore, the system sweeps table entries $PT_{k \cdot (n-1)}$ to $PT_{k \cdot (n)-1}$. Thus, during the first sweep, table entries $PT_0$ to $PT_{19}$ are examined in the example given above.

If a recycling sweep is already in progress, i.e. the response is affirmative at Step 20, the index n is incremented (Step 32) and a sweep of the next k entries is carried out. Thus, where n=2, entries $PT20$ to $PT_{39}$ will be examined.

The process continues in this manner, with k entries in the page table being examined each time a free VSID is allocated. Each entry is examined to determine whether it contains a mapping for a VSID on the recycle list. If it does, that entry is removed from the page table.

After each sweep, the system determines whether all entries in the page table have been checked (Step 36). This situation will occur when n=x. Once all of the entries have been examined, the VSIDs in the recycle list are transferred to the free list (Step 38), yielding x new VSIDs that are available to be allocated. In addition, the recycle sweep flag RFLG is reset, and control is then returned to the program. If all of the entries in the page table have not yet been checked, i.e. the response is negative at Step 36, control is directly returned to the application program, at Step 24.

From the foregoing, it can be seen that the present invention provides an efficient approach to the allocation of large amounts of address space, without requiring time-consuming, and therefore annoying, interruptions in processing. Free addresses are always guaranteed to be available while avoiding the need for a single complete sweep of all memory allocation records in a page table to remove unused entries and determine which addresses are free. The amount of work that is done is bounded, because only a limited number of entries, k, is examined at each step of the process.

Figure 7:
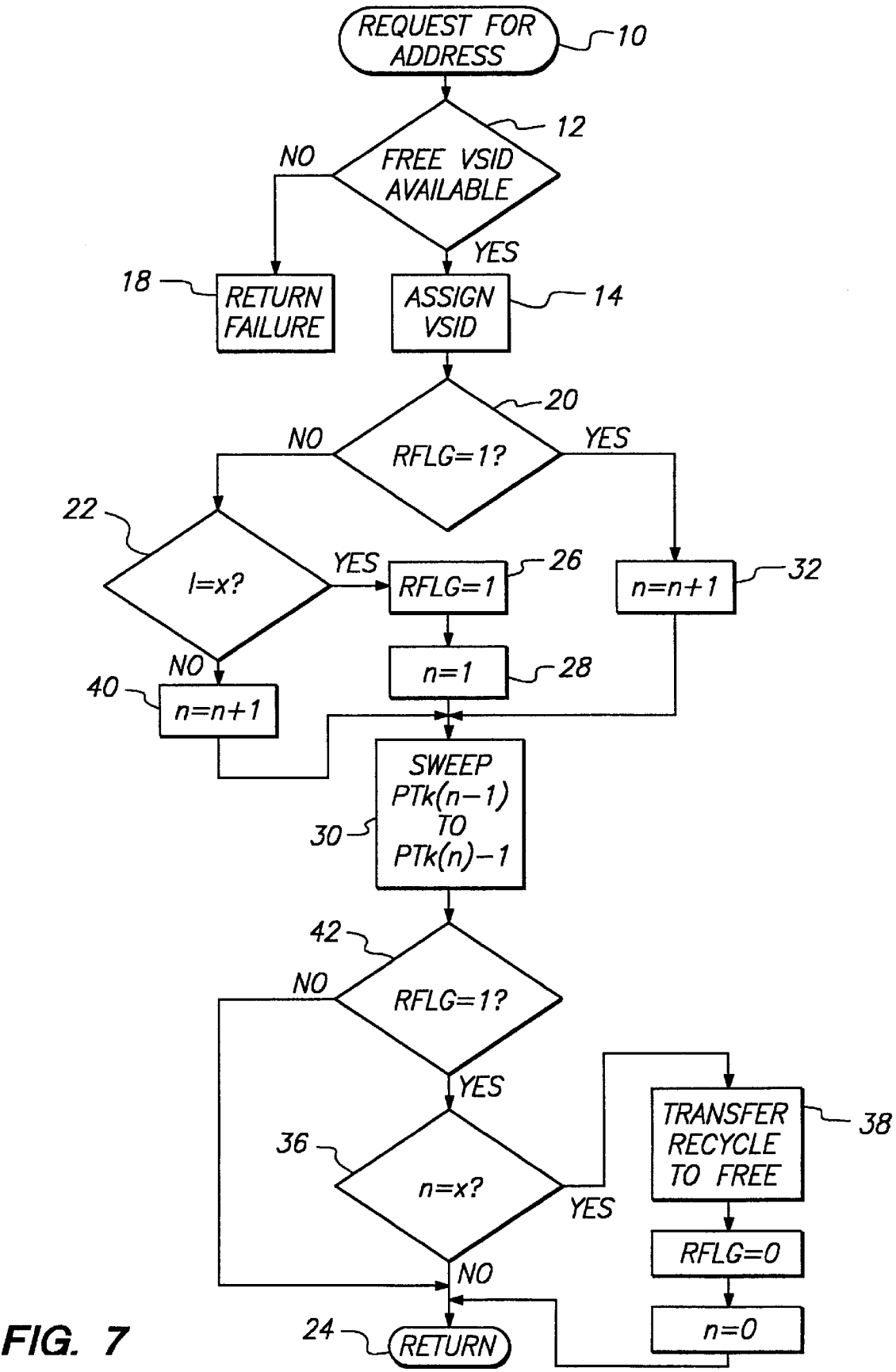
FIG. 7 is a flow chart of an alternative embodiment of the operation of the memory manager.

Variations of the foregoing process can be carried out within the scope of the present invention. For example, it is not necessary to wait for the inactive list to fill before initiating the scanning of entries in the page table. To improve page table efficiency, its entries can be examined while waiting for the inactive list to fill. This variation is illustrated in the flow chart of FIG. 7. Referring thereto, if the response at Step 22 is negative, i.e. the inactive list is not yet full, the index n is incremented at Step 40, and the process then proceeds to Step 30, where the next k entries are swept. In the sweeping process, each page table entry is checked to determine whether it has a corresponding VSID on the inactive list. If so, that entry is removed from the page table.

This approach provides a two-fold advantage. First, some inactive page table entries are removed more rapidly, since it is not necessary to wait for their VSIDs to be transferred to the recycle list. As a result, the efficiency of the page table is increased, i.e. it contains fewer inactive entries than it otherwise would. Secondly, less work is required during the sweep of the recycle list. In particular, since at least some of the page table entries for inactive VSIDs were removed prior to the time those VSIDs were transferred to the recycle list, there will not be as many entries to remove during the recycle sweep of those VSIDs.

After a sweep is completed at Step 30, the status of the flag RFLG is again checked, at Step 42, to determine whether the sweep was of the inactive list or the recycle list. If RFLG=0, indicating that the inactive list was being swept, the process returns to the main program. Otherwise, it proceeds to Step 36, as in the flowchart of FIG. 6.

While the page table entries are being examined during the sweeping process, it is possible to further enhance the efficiency of the page table by carrying out other operations as well. For example, in some page tables, a suitable number of entries are grouped together, and the addressing of entries is done by groups. In other words, the page table address PTA that results from the operation of the hashing function is the physical address of a page table entry group. Whenever a call is made to a particular virtual address, the individual page table entries within an addressed group are then checked, one by one, to determine whether they correspond to the virtual address that generated a page table search. Thus, it can be seen that it takes longer to locate an entry that resides in the last position in the group, relative to an entry in the first position in the group.

Further along these lines, two page table entry groups can be associated with one another. The hashing function value for the two groups can have any suitable relationship to one another that would enable the hashing function value of one group to be derived if the value for the other group is known. For example, they can be complements of one another. If a desired page table entry is not found in one group (the primary group), its associated group (the secondary group) is checked. Again, it takes longer to find a page table entry in the secondary group, relative to those in the primary group.

Figure 8:
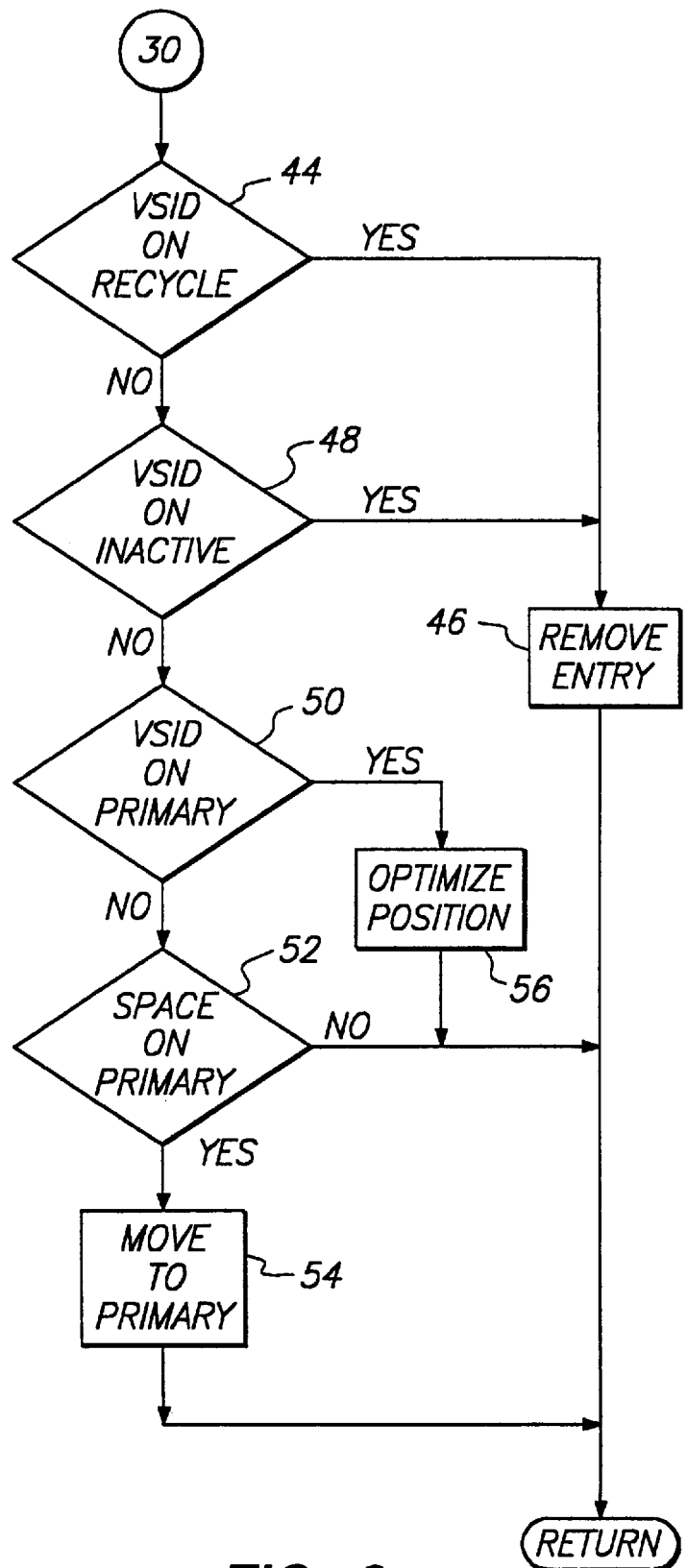
FIG. 8 is a flow chart of the sweeping routine for the alternate embodiment.

During the sweeping process, therefore, as each page table entry is being examined, its location within a group can be optimized if it is not being removed from the page table. A more detailed flow chart of the sweeping process, in which such optimization is carried out, is illustrated in FIG. 8. Referring thereto, when the sweeping process is entered (Step 30 of FIG. 7), the memory manager first determines whether the VSID associated with the page table entry of interest is on the recycle list (Step 44). If so, the entry is removed from the page table, at Step 46. If the VSID is not on the recycle list, a determination is made whether it is on the inactive list (Step 48). If so, the entry is removed at Step 46. If the VSID is not on either of these two lists, it is still active. In this case, the memory manager determines whether the entry is in the primary group (Step 50). If not, a check is made at Step 52 to determine whether a slot is available in the primary group, and if so the entry is moved to the primary group at Step 54. If the entry is already in the primary group, a determination is made at Step 56 whether it is in the highest available slot, and if not its location is optimized. With this approach, the efficiency of the page table is continually being enhanced.

It will be appreciated that the present invention is not limited to the specific embodiments which have been described herein to facilitate an understanding of its underlying principles. For example, while the memory management approach of the present invention is particularly applicable to page tables whose entries are hashed or otherwise randomly distributed throughout the table, its implementation is not limited thereto. Similarly, it is possible to initiate the sweep of page table entries in response to regularly occurring events other than the assignment of a free VSID. For example, a limited number of entries can be examined each time a thread is deleted. Furthermore, it is not necessary to examine the page table entries in a sequential manner, as described above. Rather, any systematic approach can be employed which assures that all entries will be swept. Further along these lines, the transfer of VSIDs from the recycle list to the free list need not occur only at the end of a complete sweep. Depending on the structure of the page table, it may be possible to transfer some of the VSIDs after a partial sweep of the page table, as long as it is known that all possible entries associated with those VSIDs have been examined.

The scope of the invention is therefore defined by the claims which are appended hereto, rather than the foregoing description, and all equivalents which are consistent with the meaning of the claims are intended to be embraced therein.

What is claimed is:

1. A method for allocating address space in a virtual memory system for a computer, comprising the steps of:

maintaining a list of available addresses that are free to be allocated to a program;

allocating addresses to a program in response to requests for address space;

recording entries in a page table relating to addresses that have been allocated;

upon each allocation of an available address, examining a number of entries in the page table, which number is less than the total number of entries in the table, to determine whether the entries have been identified as no longer active;

removing the entries from the table which have been determined to be no longer active, and maintaining a list of the addresses associated with the entries being removed; and transferring the list of addresses associated with removed entries to the list of allocatable addresses.

2. The method of claim 1 wherein said transferring step is carried out after all of the entries in the table have been examined.

3. The method of claim 1 wherein said number of entries that are examined upon each allocation equals p/x, where p is the total number of available addresses, and x is the maximum number of addresses that can be active at any given time.

4. The method of claim 3 wherein said examining step is initiated after x addresses have been identified as inactive.

5. The method of claim 1 wherein said number of entries that are examined upon each allocation is variable from one allocation to another.

6. In a computer system of the type in which ranges of logical addresses are assigned to programs and the assigned addresses are mapped to physical memory through entries in a page table, a method for removing entries from the page table when a range of addresses is deleted, comprising the steps of:

a) maintaining a list of addresses that have been deleted;

b) upon the occurrence of a predetermined event, examining a defined number of entries in the page table to determine whether those entries are associated with any of the addresses on said list;

c) removing each examined entry from the page table which is associated with an address on said list;

d) repeating steps b and c upon the occurrence of said event until all of the entries in the page table have been examined; and e) identifying the addresses in said list as addresses which are available to be assigned to programs.

7. The method of claim 6 wherein said predetermined event is the assignment of an address from those which are identified as being available.

8. The method of claim 6 wherein said defined number is related to the ratio of the number of addresses available to be assigned to programs relative to the number of entries in the page table.

9. The method of claim 6 wherein said defined number is variable.

10. The method of claim 6 wherein the step of maintaining a list of addresses includes the steps of identifying addresses that have been deleted as being in an inactive state, and transferring the inactive addresses to a recycle state.

11. The method of claim 10 wherein said examining step determines whether the examined entries are associated with addresses in the recycle state.

12. The method of claim 11, wherein said examining step also determines whether the examined entries are also associated with addresses in the inactive state.

13. The method of claim 10 wherein the state of a logical address is indicated by an associated identifier stored in a data structure.

14. The method of claim 13 wherein said data structure is a bitmap.

15. The method of claim 6, further including the step of processing each examined entry which is not associated with an address on said list to enhance the efficiency of the page table.

16. The method of claim 15 wherein said processing includes the step of optimizing the entry's location within the page table.

17. A system for managing memory in a computer, comprising:

means for allocating ranges of logical addresses to provide access to the memory of the computer;

a page table containing entries which map allocated logical addresses to physical addresses for the memory;

means for indicating that a range of logical addresses has been deallocated;

means responsive to the occurrence of a predetermined event for examining a limited number of the entries in the page table to determine whether they are associated with an address that has been deallocated, and for removing each such entry from the page table; and means for indicating that addresses whose entries have been removed from the page table are available for further allocation.

18. The memory management system of claim 17, wherein said indicating means comprise a data structure containing a list of logical addresses and an indicator associated with each address which identifies whether the address is available for allocation or has been deallocated.

19. The memory manager of claim 18 wherein said data structure identifies addresses as being in one of three states which respectively indicate whether the address is available for allocation, deallocated, or being processed for further availability, and further including means for changing the state of addresses from being processed to available in response to a predetermined occurrence.

20. The memory manager of claim 19 wherein said predetermined occurrence is the examination of all entries in the page table.

21. The memory manager of claim 20 wherein said processing includes optimization of the location of the examined entry in the page table.

22. The memory manager of claim 17 wherein said predetermined event is the allocation of a range of logical addresses.

23. The memory manager of claim 17 further including means for processing each examined entry in the page table that is not associated with a deallocated address to enhance the efficiency of the page table.

* * * * *